(12) United States Patent
Teichmann et al.

(10) Patent No.: US 11,165,082 B2
(45) Date of Patent: Nov. 2, 2021

(54) DEVICE AND METHOD FOR PRODUCING ELECTRICITY USING HYDROGEN AND A HYDROGEN STORAGE MEDIUM

(71) Applicant: HYDROGENIOUS LOHC TECHNOLOGIES GMBH, Erlangen (DE)

(72) Inventors: Daniel Teichmann, Munich (DE); Andreas Boesmann, Hessdorf (DE); Denise Geburtig, Nuremberg (DE); Patrick Preuster, Heideck (DE); Peter Wasserscheid, Erlangen (DE); Karsten Mueller, Nuremberg (DE); Karl Mayrhofer, Erlangen (DE); Gabriel Sievi, Erlangen (DE)

(73) Assignee: HYDROGENIOUS LOHC TECHNOLOGIES GMBH, Erlangen (DE)

( * ) Notice: Subject to any disclaimer, the term of this patent is extended or adjusted under 35 U.S.C. 154(b) by 144 days.

(21) Appl. No.: 16/621,561

(22) PCT Filed: Jun. 7, 2018

(86) PCT No.: PCT/EP2018/064946
§ 371 (c)(1),
(2) Date: Dec. 11, 2019

(87) PCT Pub. No.: WO2018/228895
PCT Pub. Date: Dec. 20, 2018

(65) Prior Publication Data
US 2020/0235414 A1 Jul. 23, 2020

(30) Foreign Application Priority Data

Jun. 12, 2017 (DE) .................. 10 2017 209 891.0

(51) Int. Cl.
*H01M 8/0606* (2016.01)
*H01M 8/04082* (2016.01)

(52) U.S. Cl.
CPC ..... *H01M 8/0606* (2013.01); *H01M 8/04201* (2013.01)

(58) Field of Classification Search
None
See application file for complete search history.

(56) References Cited

U.S. PATENT DOCUMENTS

| 8,871,393 B1 | 10/2014 | Liu et al. |
| 2004/0223907 A1 | 11/2004 | Pez et al. |

(Continued)

FOREIGN PATENT DOCUMENTS

| DE | 10 2014 201 332 A1 | 7/2015 |
| WO | 2015/075045 A1 | 5/2015 |
| WO | 2015/110334 A1 | 7/2015 |

OTHER PUBLICATIONS

Qi, Z.; Kaufmann, A, Performance of 2-Propanol in direct-oxidation fuel cells, Journal of Power Sources, 112 (2002) 121-129.

(Continued)

*Primary Examiner* — Sarah A. Slifka
(74) *Attorney, Agent, or Firm* — McGlew and Tuttle, P.C.

(57) ABSTRACT

An apparatus for generating electric power includes a hydrogen transfer unit for transferring hydrogen from a hydrogen storage medium to a hydrogen transfer medium and a power generation unit for generating electric power from the hydrogen transfer medium.

23 Claims, 7 Drawing Sheets

(56) References Cited

U.S. PATENT DOCUMENTS

2008/0248339 A1   10/2008   Soloveichik et al.
2014/0080026 A1   3/2014    Cheng et al.
2017/0008762 A1   1/2017    Arlt et al.

OTHER PUBLICATIONS

Patrick Preuster et al, Liquid Organic Hydrogen Carriers (LOHCs): Toward a Hydrogen-free Hydrogen Economy, Accounts of Chemical Research, Bd. 50, Nr. 1., Jan. 17, 2017 (Jan. 17, 2017), pp. 74-85.

DEVICE AND METHOD FOR PRODUCING ELECTRICITY USING HYDROGEN AND A HYDROGEN STORAGE MEDIUM

CROSS REFERENCE TO RELATED APPLICATIONS

This application is a United States National Phase Application of International Application PCT/EP2018/064946 filed Jun. 7, 2018 and claims the benefit of priority under 35 U.S.C. § 119 of German Patent Application, Serial No. DE 10 2017 209 891.0, filed on Jun. 12, 2017, the entire contents of which are incorporated herein by reference.

FIELD OF THE INVENTION

The invention relates to an apparatus and a process for generating electric power.

BACKGROUND OF THE INVENTION

Hydrogen as energy carrier can be advantageously stored and handled by means of liquid organic hydrocarbon compounds (LOHC). LOHC as hydrogen storage medium for a motor vehicle powered using LOHC is known from the prior art. In such a vehicle, a dehydrogenation reactor is necessary in order to liberate the hydrogen gas bound in the LOHC and feed it to a fuel cell for conversion into electric power. The liberation of hydrogen from LOHC is endothermic. The dehydrogenation reaction takes place in a temperature range from about 280° C. to 320° C. The waste heat evolved in the fuel cell at an operating temperature of not more than 160° C. is insufficient for sole preheating of the dehydrogenation reactor. Additional provision of heat at reaction temperature is necessary. The efficiency of an LOHC vehicle is reduced. The outlay in terms of apparatus for the production and provision of the hydrogen gas for the fuel cell is increased. A direct fuel cell is known from Qi, Z.; Kaufmann, A.: "Performance of 2-Propanol in direct-oxidation fuel cells", Journal of Power Sources, 112 (2002) 121-129. The direct fuel cell makes it possible to convert the hydrogen on 2-propanol into acetone plus electric power. Compared to LOHC, 2-propanol has a reduced hydrogen storage density, so that a vehicle having a direct fuel cell powered by 2-propanol has a reduced range compared to an LOHC vehicle.

Further apparatuses for storing hydrogen in chemically bound form are known from WO 2015/075045 A1 and from Preuster, P. et al.: "Liquid Organic Hydrogen Carriers (LOHCs): Toward a Hydrogen-free Hydrogen Economy", Accounts of chemical research, 50 (2017) 74-85.

Further apparatuses each having a direct fuel cell are known from U.S. Pat. No. 8,871,393 B1, US 2008/0248339 A1 and US 2014/0080026 A1.

SUMMARY OF THE INVENTION

It is an object of the present invention to improve the generation of electric power, especially in mobile applications, in particular to increase the efficiency in power generation.

The object is achieved by an apparatus for generating electric power, comprising a hydrogen transfer unit for transferring hydrogen from a hydrogen storage medium to a hydrogen transfer medium and a power generation unit for generating electric power from the hydrogen transfer medium. The object is further achieved by a process for generating electric power, comprising the process steps transfer of hydrogen from a hydrogen storage medium to a hydrogen transfer medium by means of a hydrogen transfer unit and generation of electric power from the hydrogen transfer medium by means of a power generation unit.

It was recognized according to the invention that power generation is particularly efficient when hydrogen which is stored in a hydrogen storage medium, in particular LOHC, can be transferred in a hydrogen transfer unit to a hydrogen transfer medium which in turn can be advantageously used in a power generation unit for generating electric power from the hydrogen transfer medium. The transfer of the hydrogen is, in particular, carried out directly and in particular directly from the hydrogen storage medium to the hydrogen transfer medium. In particular, intermediate steps are dispensable in the hydrogen transfer. In particular, it is not necessary to liberate hydrogen from the hydrogen storage medium in a first, separate process step in order to bind the resulting hydrogen gas in a second, separate hydrogenation step to the hydrogen transfer medium.

It is a characteristic of the present invention that the hydrogen storage medium used and the hydrogen transfer medium used are two different materials systems. The hydrogen storage medium has a higher storage density than the hydrogen transfer medium. The hydrogen storage medium typically has a storage density of at least 30 g of $H_2$/l, in particular at least 35 g of $H_2$/l, in particular at least 40 g of $H_2$/l, in particular at least 45 g of $H_2$/l, in particular at least 50 g of $H_2$/l, in particular at least 55 g of $H_2$/l.

A further characteristic of the hydrogen storage medium is that it has excellent compatibility with the materials, apparatuses and plants of the infrastructure existing today for the stocking and transport of fuels. This results in particular in the industrially relevant circumstance that the hydrogen storage medium can be handled without problems in vessels, tank farms and tanker vehicles which were originally constructed for the handling of gasoline and diesel. The hydrogen storage medium can therefore be utilized without the necessity for a new infrastructure.

A further characteristic of the hydrogen storage medium is that it cannot be converted directly into electric power with satisfactory efficiency in a fuel cell. On contact of the hydrogen-laden hydrogen storage medium with the noble metal-containing anode of a fuel cell, for example a Pt/Ru-containing anode, power densities of less than 1 mW/cm$^2$ are obtained in fuel cell operation using atmospheric oxygen on the cathode side.

In contrast thereto, the hydrogen transfer medium can be converted directly into electric power with satisfactory efficiency in a fuel cell. On contact of the hydrogen-laden hydrogen transfer medium with the noble metal-containing anode of a fuel cell, for example a Pt/Ru-containing anode, power densities of more than 1 mW/cm$^2$, in particular more than 10 mW/cm$^2$, in particular more than 60 mW/cm$^2$, are obtained in fuel cell operation using atmospheric oxygen on the cathode side.

It has surprisingly been found that it is possible to utilize LOHC as hydrogen storage medium in order to transfer hydrogen directly to the hydrogen transfer medium. It has been recognized that the hydrogen transfer unit can be particularly advantageously configured as described in DE 10 2014 201 332 A1. A further transfer unit is known from US 2004/0223907 A1.

In particular, the generation of electric power occurs directly and without an intermediary in a direct fuel cell. The invention thus utilizes firstly the high storage density of the hydrogen storage medium and secondly the efficient conversion of the hydrogen transfer medium into electric power in the power generation unit. In addition, it has surprisingly been found that the transfer of hydrogen into the hydrogen transfer unit can be carried out essentially thermoneutrally, so that introduction of heat is substantially and in particular fully dispensable. Additional heating elements can be omitted. Heat which is generated in the power generation unit in the direct conversion of the hydrogen transfer medium into electric power can be utilized directly for preheating the hydrogen transfer unit. A heat transfer unit, in particular, is employed for this purpose. The transfer of hydrogen to the hydrogen storage medium in the hydrogen transfer unit occurs in an at least partially loaded state $LOHC^+$ into a partially unloaded state of the hydrogen transfer medium $LOHC^-$. Correspondingly, hydrogen transfer medium is converted from an at least partially unloaded state $TM^-$ into an at least partially loaded state $TM^+$.

The apparatus of the invention allows transfer hydrogenation under approximately thermoneutral conditions and in particular direct hydrogen transfer from $LOHC^+$ to $TM^-$ to $LOHC^-$ and $TM^+$. The transfer occurs largely and in particular completely without liberation of hydrogen. The hydrogen transfer medium is regenerable and advantageously serves for operating the polymer electrolyte membrane fuel cell. Total oxidation is avoided. The fuel cell can be operated without elemental hydrogen in the system. $CO_2$ emissions using a high-energy-density storage medium are avoided, in contrast to other direct fuel cells such as the direct methanol fuel cell. The apparatus has a high degree of safety. The heat of dehydrogenation is consumed directly in the power generation unit, in particular in the fuel cell. The heat of dehydrogenation does not have to be provided by combustion or an external heat source. The temperatures in the overall system are advantageously below 250° C. Provision of heat is essentially not necessary. A possible outlay for additional heating is reduced.

Compared to a direct methanol fuel cell, the apparatus of the invention has a higher efficiency and avoids carbon dioxide emissions. Compared to the 2-propanol from the known direct 2-propanol fuel cell, LOHC makes an increased energy storage density possible. In particular, the energy storage density of perhydrodibenzyltoluene is 56 g of $H_2$/l. The energy storage density of 2-propanol is in contrast only 26 g of $H_2$/l.

Potential fields of application for the apparatus are low-noise power generation in small, self-sufficient plants, supply of electric power on mobile platforms, power generation in the operation of vehicles of all types, especially for on-board charging of a battery which drives appropriate electric motors. The invention makes efficient hydrogen mobility possible without elemental hydrogen on board a vehicle which can nevertheless be operated largely without $CO_2$ emissions, in contrast to a direct methanol fuel cell.

An apparatus comprising a hydrogen storage medium storage unit for storing the hydrogen storage medium in at least partially loaded state $LOHC^+$ and/or in at least partially unloaded state $LOHC^-$, with $LOHC^+$ and $LOHC^-$ preferably each being stored in a separate storage chamber without mixing, makes advantageous storage of the hydrogen storage medium possible. The hydrogen storage medium storage unit can have a plurality of hydrogen storage medium storage vessels which are, for example, separate from one another. In particular, a hydrogen storage medium storage unit can have a single hydrogen storage medium storage vessel in which the hydrogen storage medium in various states is stored. It is also conceivable to provide at least two separate chambers in the hydrogen storage medium storage vessel, with a first chamber being provided for storage of the hydrogen storage medium in the at least partially loaded state and a second chamber being provided for storing the hydrogen storage medium in an at least partially unloaded state.

An apparatus comprising a hydrogen transfer medium storage unit for storing the hydrogen transfer medium, allows the advantageous storage of the hydrogen transfer medium, with two separate hydrogen transfer medium storage vessels being able to be provided. As a result of the hydrogen transfer medium being able to be recharged cyclically and in particular essentially as often as desired with hydrogen, the storage requirement for the hydrogen transfer medium is reduced. The hydrogen transfer medium forms a working fluid like, for example, engine oil in an internal combustion engine.

The configuration of the power generation unit as a fuel cell, in particular a direct fuel cell, for converting the hydrogen transfer medium into electric power, allows direct and advantageous utilization of the hydrogen transfer medium as energy carrier. Liberation of elemental hydrogen is dispensable. The fuel cell can be, as desired, a high-temperature fuel cell or a low-temperature fuel cell.

An apparatus comprising a fuel cell having a membrane, in particular a proton-conducting membrane, makes an increased energy yield of the apparatus possible. The efficiency of the apparatus is improved.

An apparatus comprising an electric battery which is connected to the power generation unit and is in particular connected directly to the power generation unit, makes a constant power offtake from the power generation unit possible. Intermediate storage of electric energy by means of a battery is dispensable.

An apparatus comprising an electric load, in particular an electric motor, which is, in particular, connected to the battery, is, in particular, suitable for mobile use in a motor vehicle powered by an electric motor. The apparatus makes a calculated range of up to 900 km possible in an electrically powered motor vehicle. In particular, the range is increased compared to an otherwise identical motor vehicle powered purely by LOHC or powered purely by 2-propanol/acetone.

Hydrogen storage medium/hydrogen transfer medium separation units for separating the hydrogen storage medium from the hydrogen transfer medium, for separating at least partially loaded hydrogen transfer medium from at least partially unloaded hydrogen transfer medium, with the hydrogen transfer medium separation unit being arranged downstream of the power generation unit and for separating at least partially loaded hydrogen storage medium from at least partially unloaded hydrogen storage medium, with the hydrogen storage medium separation unit being arranged downstream of the hydrogen storage medium/hydrogen transfer medium separation unit, reliably guarantee substantial separation of the streams of material within the apparatus. As a result of the hydrogen storage medium and the hydrogen transfer medium coming into direct contact in the hydrogen transfer unit, separation of hydrogen storage medium and hydrogen transfer medium is advantageous. Separation of the media in the loaded state from media in the unloaded state increases the efficiency in the generation of electric power.

A regulating unit for regulated operation of the apparatus, with the regulating unit being, in particular, in bidirectional signal communication with the units, allows, in particular, flexible operation of the apparatus, in particular targeted realization of different operating states. The regulating unit is in bidirectional signal communication with the hydrogen transfer unit, the power generation unit, the electric battery, the electric motor, the separation units and/or the storage units.

A mobile device comprising an apparatus according to the invention is in particular a vehicle powered by an electric motor, in particular a motor vehicle in the form of an automobile, a rail vehicle or a water vehicle.

The generation of electric power comprising the process steps transfer of hydrogen from a hydrogen storage medium to a hydrogen transfer medium by means of a hydrogen transfer unit and generation of electric power from the hydrogen transfer medium by means of a power generation unit, has essentially the advantages of the apparatus, to which reference is hereby made.

The use of the hydrogen storage medium, said hydrogen storage medium comprising a liquid, in particular a liquid mixture of a plurality of organic compounds, allows advantageous handling, in particular in respect of refueling of the motor vehicle and/or the transfer of the hydrogen to the hydrogen transfer medium.

The hydrogen storage medium is a liquid. It is intended that a liquid, hydrogen-rich hydrogen storage compound or mixtures of liquid, hydrogen-rich hydrogen storage compounds be provided in a storage vessel or tank for use in the inventive arrangement and in particular for the transfer of hydrogen to the hydrogen transfer system. In this transfer, the liquid, hydrogen-rich hydrogen compound or the corresponding mixtures of such compounds is/are transformed into a low-hydrogen form. The liquid, hydrogen-rich hydrogen storage compound provides hydrogen in bound form, in particular in chemically bound form. The handling of molecular, gaseous hydrogen, the storage and handling of which is complicated and presents a safety risk and therefore requires complicated apparatus, associated with high costs, in order to minimize safety risks, can be circumvented thereby.

The liquid, hydrogen-rich hydrogen storage compound used is, in particular, the hydrogen-rich compound of an LOHC system as is known in the prior art from Accounts of Chemical Research, 2017, 50(1), 74-85. The provision of hydrogen in the form of a hydrogen-rich LOHC compound has the particular advantage that LOHC hydrogen storage compounds are present as organic compound in liquid form under the storage and process conditions employed. In particular, the LOHC hydrogen storage compounds can be reversibly loaded with hydrogen and unloaded of hydrogen. The physicochemical properties of the LOHC hydrogen storage compounds have great similarity to conventional liquid fuels, so that tanks, pumps and tank vehicles can be utilized for transport and as storage vessels from the field of fuel and combustibles logistics. The storage of hydrogen in chemically bound form in an organic liquid allows atmospheric-pressure storage under normal conditions over long periods of time without a significant loss of hydrogen.

Particularly suitable liquid, hydrogen-rich LOHC hydrogen storage compounds are, in particular, saturated, cyclic hydrocarbons which have one or more six-membered rings and on release of hydrogen can be converted into aromatic compounds having a π electron system or a plurality of π electron systems. The hydrogen-rich form can be obtained again from these low-hydrogen compounds by catalytic hydrogenation. As liquid, hydrogen-rich LOHC hydrogen storage compounds, it is possible to use, in particular, perhydrodibenzyltoluenes and perhydrobenzyltoluenes as pure substances, isomer mixtures or mixtures of the substances with one another. It is also possible for heteroatom-containing, cyclic compounds which on release of hydrogen are converted into low-hydrogen, heteroaromatic compounds having a π electron system or a plurality of π electron systems to be utilized as liquid, hydrogen-rich LOHC hydrogen storage compounds. Perhydro-N-ethylcarbazole, perhydro-N-propylcarbazole, perhydro-N-isopropylcarbazole, perhydro-N-butylcarbazole, perhydro-N-ethylindole or mixtures of these substances with one another are particularly suitable.

The liquid, hydrogen-rich hydrogen storage compound and in particular an LOHC hydrogen storage compound loaded with hydrogen and also mixtures of such compounds represent a suitable transport form and storage form for the chemically bound hydrogen since the physicochemical properties of the hydrogen-loaded LOHC hydrogen storage compound greatly resemble those of diesel and other fuels.

The use of a hydrogen transfer medium, said hydrogen transfer medium in the at least partially unloaded state has a carbon-oxygen double bond of the type

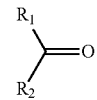

where $R_1$ and $R_2$ are identical or different and are each an alkyl radical, cycloalkyl radical or aryl radical having 1-8 carbon atoms or $R_1$ and $R_2$ are joined to form a ring and $R_1$ and $R_2$ have one or more additional carbon-oxygen double bonds in addition to the carbon atoms, makes the advantageous direct conversion into electric power in a direct fuel cell possible. The hydrogen transfer medium utilized in the arrangement according to the invention consists of two compounds, namely a hydrogen-rich form of the hydrogen transfer medium and a low-hydrogen form of the hydrogen transfer medium. When the hydrogen-rich form of the hydrogen transfer medium releases hydrogen, the low-hydrogen form of the hydrogen transfer medium is formed.

In the arrangement according to the invention, the hydrogen-rich form of the hydrogen transfer medium releases hydrogen predominantly in a fuel cell in which the initially bound hydrogen is firstly transformed into protons and subsequently reacts with the introduced oxygen to form water and electric power is produced in the process.

In the arrangement according to the invention, the low-hydrogen form of the hydrogen transfer medium takes up hydrogen predominantly in the unit for hydrogen transfer where the hydrogen is predominantly transferred directly from the liquid hydrogen-rich hydrogen storage compound to the low-hydrogen form of the hydrogen transfer medium, and in this way the hydrogen-rich form of the hydrogen transfer medium is formed.

Suitable hydrogen transfer media have, in their low-hydrogen form, at least one carbon-oxygen double bond of the type

where $R_1$ and $R_2$ can each be an alkyl radical, cycloalkyl radical or aryl radical having 1-8 carbon atoms or a radical which in addition to the carbon atoms has one or more additional carbon-oxygen double bonds or carbon-oxygen single bonds. Furthermore, one or more hydrogen atoms of the radical R can be replaced by fluorine atoms. The radicals $R_1$ and $R_2$ can also contain other atoms apart from carbon, hydrogen and oxygen. However, these should be selected so that they do not inhibit the action of the catalysts used in the fuel cell or in the transfer of hydrogen between the liquid, hydrogen-rich hydrogen storage compound and the transfer medium. The radicals $R_1$ and $R_2$ can be identical or different. They can also be joined to one another to form a ring, in which case one or more ring members can be replaced by oxygen atoms.

The low-hydrogen form of suitable hydrogen transfer media is converted quite predominantly by uptake of hydrogen into a compound which has the corresponding carbon-oxygen single bond of the type

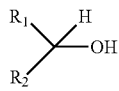

The uptake of hydrogen does not change the radicals $R_1$ and $R_2$ since the radicals contain a plurality of carbon-oxygen double bonds which can likewise take up hydrogen and be converted into a carbon-oxygen single bond.

Hydrogen transfer media which in their hydrogen-rich form can be converted directly by reaction with oxygen in a fuel cell into water, electric power and the low-hydrogen form without the hydrogen transfer medium being converted in this case to an appreciable extent, i.e. in a proportion of less than 30%, into carbon dioxide or other decomposition products and becoming unusable in this way are suitable.

Furthermore, hydrogen transfer media whose low-hydrogen form and hydrogen-rich form are thermally stable up to at least 100° C., which is indicated by thermal decomposition of the compounds at 100° C. of less than 10% per hour, are suitable.

Furthermore, hydrogen transfer media for which the hydrogen-rich form and the low-hydrogen form of the hydrogen transfer medium have significantly different boiling points are suitable. Boiling point differences of at least 20° C. characterize such suitable hydrogen transfer media.

Furthermore, hydrogen transfer media where the boiling points of their hydrogen-rich and low-hydrogen forms are in the range from 40° C. to 340° C. at ambient pressure are suitable.

Furthermore, hydrogen transfer media where the melting points of their hydrogen-rich form and their low-hydrogen form are in the range from −100° C. to 120° C. at ambient pressure are suitable. If the melting point is above room temperature, a good solubility in water of the hydrogen-rich form and the low-hydrogen form additionally characterizes particularly suitable hydrogen transfer media of this type. Quite generally, some miscibility of the hydrogen-rich form and the low-hydrogen form of the hydrogen transfer medium with water is advantageous. Suitable hydrogen transfer media can be admixed with from 0.01 to 50 percent by weight of water without forming a liquid-liquid miscibility gap with water in order to decrease the viscosity, to humidify the fuel cell or realize particularly simple separation of the hydrogen transfer medium from the hydrogen-rich or low-hydrogen hydrogen storage compound or of mixtures of such hydrogen storage compounds.

Furthermore, hydrogen transfer media which have a hydrogen capacity of at least 1% and whose molecular mass thus increases by at least 1% on loading of the low-hydrogen form with hydrogen to the maximum loading limit are suitable.

Furthermore, hydrogen transfer media which have the property that neither their hydrogen-rich form nor their low-hydrogen form inhibits the action of the catalysts used in the fuel cell and in the unit for hydrogen transfer are suitable.

Furthermore, hydrogen transfer media whose low-hydrogen form can take up hydrogen from the liquid, hydrogen-rich hydrogen storage compound or corresponding hydrogen storage compound mixtures rapidly and without by-product formation in the unit for hydrogen transfer and can release this hydrogen again rapidly and without appreciable by-product formation in the form of protons and electrons in a fuel cell in order to produce electric power and water with the introduced oxygen are suitable.

For some embodiments of the arrangement according to the invention, it is advantageous for the hydrogen-rich form, the low-hydrogen form or both forms of the hydrogen transfer medium to have a liquid-liquid miscibility gap with the different, hydrogen-rich or low-hydrogen forms of the liquid hydrogen storage compound or corresponding mixtures.

For some embodiments of the arrangement according to the invention, it is also advantageous for the low-hydrogen form of the hydrogen transfer medium to have more than one carbon-oxygen double bond, since the hydrogen transfer capacity of the hydrogen transfer medium is increased in this way.

Suitable hydrogen transfer media claimed are, in particular, compounds which in their hydrogen-rich form contain 1-10 secondary alcohol groups which on release of hydrogen in the fuel cell can be converted into the corresponding compounds having 1-10 keto groups.

Particular preference is given to the following hydrogen transfer media, with the hydrogen-rich form $TM^+$ always being given first and the low-hydrogen form $TM^-$ being given next in the following listing:
2-propanol/acetone
2-butanol/2-butanone
2-pentanol/2-pentanone
3-pentanol/3-pentanone
2-hexanol/2-hexanone
3-hexanol/3-hexanone
2,3-butanediol/2,3-butanedione
2,3-pentanediol/2,3-pentanedione
2,4-pentandiol/2,4-pentanedione
2,3,4-pentanetriol/2,3,4-pentanetrione
2,3-hexanediol/2,3-hexanedione
2,4-hexanediol/2,4-hexanedione
2,5-hexanediol/2,5-hexanedione
cyclopentanol/cyclopentanone
cyclohexanol/cyclohexanone Mixtures of these substances are also possible, as are mixtures with inert, further liquids, in particular water.

In addition or as an alternative, the hydrogen transfer medium can also be formed by hydrogen on one or more C—H bonds in each case being replaced by a fluorine atom.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying

DESCRIPTION OF THE PREFERRED EMBODIMENTS

Figure 1:
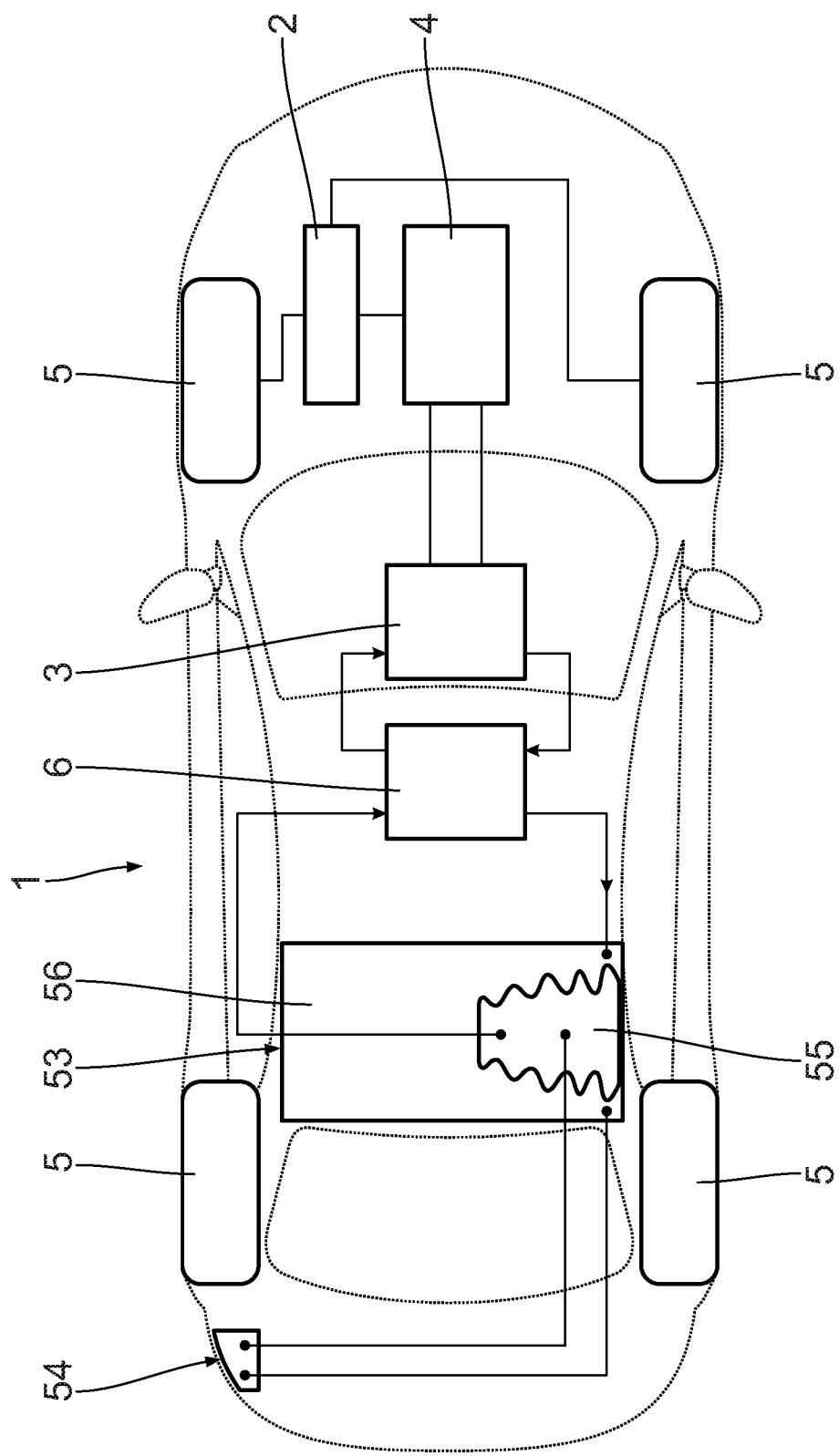
FIG. 1 is a highly schematic view of a mobile device in the form of an electrically powered vehicle according to the invention.

In the following, a mobile device comprising an apparatus for generating electric power will be illustrated in more detail with the aid of FIGS. 1 to 5. The mobile device is an automobile 1 in the working example shown. The automobile 1 has an electric motor 2 as drive. The electric motor 2 is, in particular, a DC electric motor. The automobile 1 is powered by the electric motor. The automobile 1 is an electric car.

The electric power required for operating the electric motor 2 is generated on-board by means of a power generation unit 3 in the form of a direct fuel cell. The direct fuel cell is present on the automobile 1. The direct fuel cell is integrated into the automobile 1. The power generation unit 3 is connected to an electric battery 4 which serves for temporary storage of the electric power generated in the power generation unit 4 and in which electric power is buffered. The electric power is consumed directly in the electric motor 2 to drive the wheels 5 of the automobile 1. For this purpose, the electric motor 2 is connected in a force-transmitting manner to the wheels 5 of the automobile 1.

The power generation unit 3 is operated by means of a hydrogen transfer medium. In the power generation unit 3, electric power is generated directly and without an intermediary from the hydrogen transfer medium. A hydrogen-rich form of the hydrogen transfer medium TM$^+$, i.e. hydrogen transfer medium in an at least partially loaded state, is fed to the power generation unit 3 and hydrogen transfer medium in low-hydrogen form TM$^-$, i.e. in an at least partially unloaded state or a state having a low loading, is discharged. TM$^-$ can be at least partially loaded again with hydrogen in a hydrogen transfer unit 6 and subsequently converted into electric power in the power generation unit 3. Loading of the hydrogen transfer medium in the hydrogen transfer unit 6 is effected by hydrogen being transferred from a hydrogen storage medium to the hydrogen transfer medium. The transfer of the hydrogen in the hydrogen transfer unit 6 occurs, in particular, without an intermediary and directly. Separate liberation of hydrogen, the handling of hydrogen gas and the combining of the hydrogen gas with the hydrogen transfer medium in separate reactors are dispensable.

The hydrogen transfer unit 6 is, in particular, connected to a hydrogen storage medium storage unit 53. The hydrogen storage medium is stored in the hydrogen storage medium storage unit 53.

The hydrogen storage medium storage unit 53 preferably has two chambers which can be filled and emptied separately. Storage of the hydrogen storage medium in an at least partially loaded state LOHC$^+$ preferably occurs in a first storage chamber 55 of the hydrogen storage medium storage unit 53, which can be filled from the outside with LOHC$^+$ via a filling coupling 54. Storage of the hydrogen storage medium in an at least partially unloaded state LOHC$^-$ preferably occurs in a second storage chamber 56 of the hydrogen storage medium storage unit 53 from which the LOHC$^-$ can be drawn off outward via the filling coupling 54. The first storage chamber 55 and the second storage chamber 56 are, in particular, separated from one another, in particular by means of a flexible membrane.

The hydrogen storage medium is unloaded, i.e. converted from an at least partially loaded state LOHC$^+$ into an at least partially unloaded state LOHC$^-$, by transfer of hydrogen to the hydrogen transfer medium in the hydrogen transfer unit 6. LOHC$^-$ can be taken from the hydrogen storage medium storage unit 53 and LOHC$^+$ can be fed in again, in particular in a filling procedure.

The arrangement shown in FIG. 1 can not only serve for supplying an automobile with electricity but also for supplying a bicycle, a motor bike, a goods vehicle, a building or mine vehicle, a forklift truck, a specialty forestry vehicle, a bus, a rail vehicle, a ship, an airship or an aircraft. The arrangement can serve to cover the entire energy requirement of the vehicle or to cover only part of the energy requirement.

Figure 2:
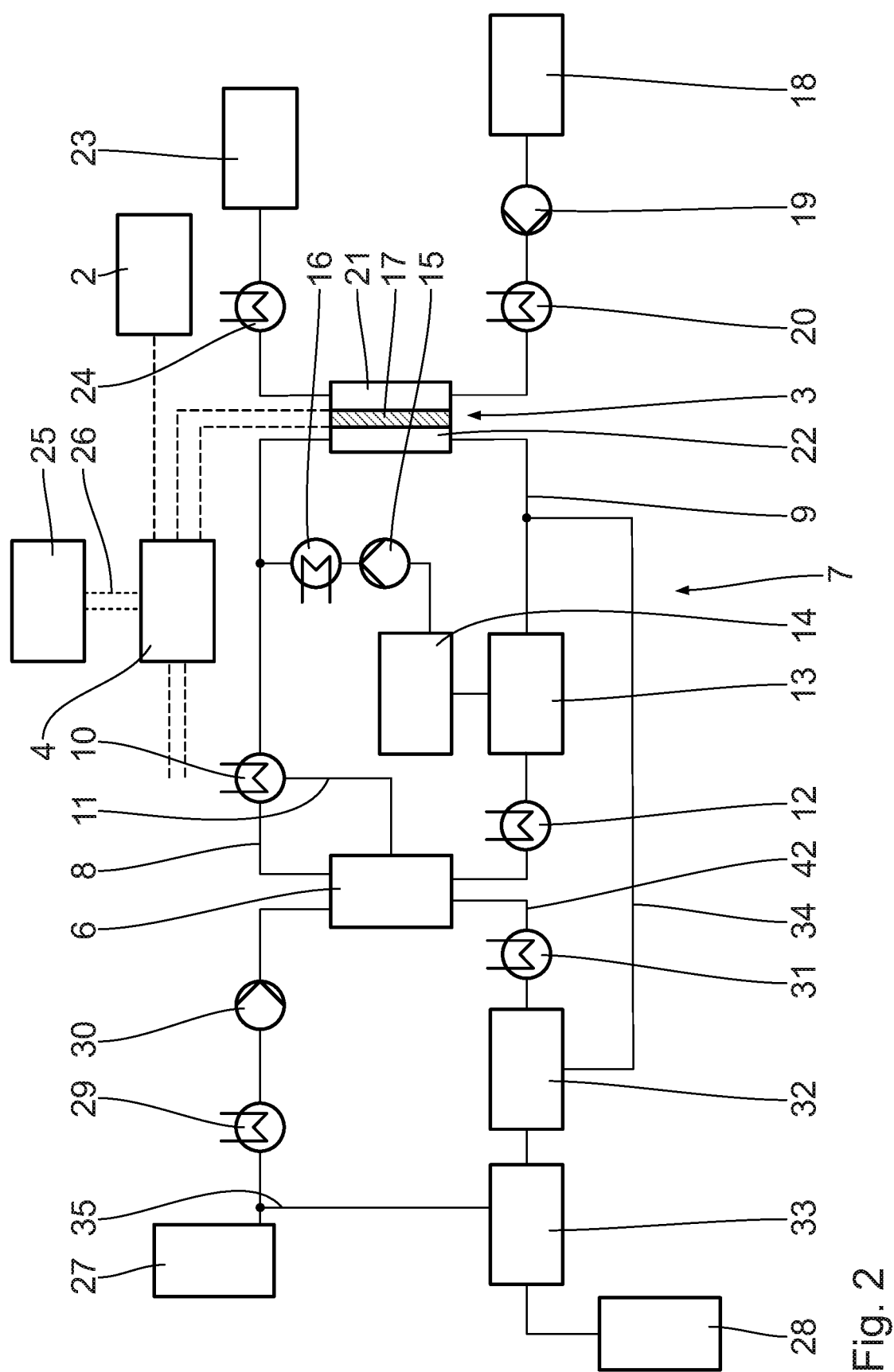
FIG. 2 is a schematic detailed view of an apparatus according to the invention for generating electric power according to a first working example.

An apparatus for generating electric power will be explained in more detail below with the aid of FIG. 2. The apparatus designated overall by 7 comprises the hydrogen transfer unit 6 and the power generation unit 3. The power generation unit 3 is configured as direct fuel cell. The hydrogen transfer unit 6 and the power generation unit 3 are joined to one another via a first circulation conduit 8 in order to convey TM$^+$ which has been enriched with hydrogen in the hydrogen transfer unit 6 into the power generation unit 3.

The hydrogen transfer unit 6 and the power generation unit 3 are connected to one another by means of a second circulation conduit 9 in order to convey hydrogen transfer medium which has been at least partially converted into electric power in the power generation unit 3 into the hydrogen transfer unit 6. The power generation unit 3, the hydrogen transfer unit 6 and the circulation conduits 8, 9 form a closed circulation system.

A first circulation heat exchanger 10 is arranged along the first circulation conduit 8. In the first circulation heat exchanger 10, gaseous LOHC$^+$ and/or LOHC$^-$ can condense and be recirculated through a first circulation return conduit 11 into the hydrogen transfer unit 6. The first circulation heat exchanger 10 serves to cool the enriched hydrogen transfer medium from a temperature range of 120° C.-180° C. to about 80° C.

A second circulation heat exchanger 12 is arranged along the second circulation conduit 9. The second circulation heat exchanger 12 serves to preheat and/or vaporize TM$^-$ before it is fed into the hydrogen transfer unit 6. Heating from 50° C. to about 180° C. takes place. A hydrogen transfer medium separation unit 13, which serves to separate TM$^+$ and TM$^-$, is arranged upstream of the second circulation heat exchanger 12. As hydrogen transfer medium, 2-propanol serves as TM⁺ and acetone serves as TM⁻ in the working example shown. The hydrogen transfer medium separation unit 13 can be actively cooled in order to condense out remaining hydrogen-enriched hydrogen transfer medium TM⁺ from an exhaust gas mixture from the power generation unit 3 and feed it to the hydrogen transfer medium storage unit 14. The typical temperature of the condensation at atmospheric pressure is in a temperature range from 5° C. to 50° C. below the boiling point of the hydrogen-enriched hydrogen transfer medium TM⁺, in particular in a temperature range from 10° C. to 30° C. below the boiling point.

A hydrogen transfer medium storage unit 14 is connected directly to the hydrogen transfer medium separation unit 13 in order to store the hydrogen transfer medium. The hydrogen transfer medium storage unit 14 is connected via a hydrogen transfer medium pump 15 and a hydrogen transfer medium heat exchanger 16 to the power generation unit 3. In the working example shown, the hydrogen transfer medium heat exchanger 16 is connected to the first circulation conduit 8. The hydrogen transfer medium heat exchanger 16 can also be connected by means of a separate transport conduit to the power generation unit 3. The hydrogen transfer medium heat exchanger 16 serves to heat the enriched hydrogen transfer medium from the hydrogen transfer medium storage unit 14. The heat exchanger 16 serves as preheater and in particular as vaporizer for the enriched hydrogen transfer medium. The heat exchanger 16 can be provided with electric supplementary heating in order to make it possible to heat the hydrogen transfer medium from 30° C. to 80° C.

The power generation unit 3 has a proton-conducting member 17, the function of which will be explained in more detail below.

The power generation unit 3 is, in particular, actively cooled in order to ensure an operating temperature of from about 70° C. to 100° C. The operating temperature of the power generation unit 3 is in particular in a temperature range from 80° C. to 90° C.

An oxygen stock 18 is connected via an oxygen pump 19 and an oxygen heat exchanger 20 to a cathode side 21 of the power generation unit 3. The oxygen stock 18 is ambient air in the working example shown. In addition or as an alternative, a storage vessel containing an oxygen-containing gas mixture can be provided as oxygen stock 18. The oxygen heat exchanger 20 allows preheating of the air for the power generation unit 3. The circulation conduits 8, 9 are in each case connected to an anode side 22 on the power generation unit 3. The membrane 17 is arranged between the cathode side 21 and the anode side 22 of the power generation unit 3.

A water storage vessel 23 is connected to the cathode side 21. Instead of the water storage vessel 23, water from the power generation unit 3 can also be introduced into a conduit system or conduit network provided for this purpose. The water storage vessel 23 can also be omitted, so that wastewater from the power generation unit 3 can be conveyed directly into a wastewater channel system. A water heat exchanger 24 is provided between the power generation unit 3 and the water storage vessel 23 in order to condense water vapor from the power generation unit 3. The water heat exchanger 24 serves to cool the wastewater from the power generation unit 3 from about 80° C. to about 40° C. The power generation unit 3 is connected via electric leads to the electric battery 4. The electric battery 4 is connected via an electric lead to the electric motor 2.

The electric battery 4 is, in particular, connected directly to the heat exchangers 29, 16, 20 and/or 12 which are employed for heating.

The apparatus 7 has a regulating unit 25. The regulating unit 25 is, in particular, in bidirectional signal communication with the battery 4, all pumps 15, 19 and 30, all heating devices 12, 16, 20 and 29 and/or all control valves of the apparatus 7. The regulating unit 25 makes regulated, in particular fully automatic, operation of the apparatus 7 possible. For reasons of clarity, not all signal communication lines are depicted in FIG. 2. By way of example, the signal communication 26 between the regulating unit 25 and the electric battery 4 is shown. The signal communications 26 from the regulating unit 25 to the components of the apparatus 7 can be configured with or without cables.

The hydrogen storage medium storage unit 53 of the apparatus 7 comprises a first hydrogen storage medium storage vessel 27 and a second hydrogen storage medium storage vessel 28. The hydrogen storage medium storage vessels 27, 28 have essentially the same construction and have approximately the same volume. For space reasons, in particular on board a vehicle, in particular on board an automobile, it is conceivable to integrate the two storage vessels 27, 28 into a single storage vessel, for example by means of a movable membrane between two storage vessel chambers. The volume of such a storage vessel is in the case of an automobile, for example, 80 l. In the case of a goods vehicle or a train, the volume of such a storage vessel can have volumes of from several hundred liters to several thousand or several tens of thousands of liters. In stationary plants, the hydrogen storage medium storage vessels 27 and 28 can have volumes of several thousand liters, several tens of thousands of liters or several hundreds of thousands of liters. Even larger storage volumes are technically feasible and can be used for the long-term storage of energy.

LOHC⁺, in particular perhydrobenzyltoluene, referred to as H18 DBT, is kept in stock in the first hydrogen storage medium storage vessel 27. The first hydrogen storage medium storage vessel 27 is connected via a first hydrogen storage medium heat exchanger 29 and a hydrogen storage medium pump 30 to the hydrogen transfer unit 6. The first hydrogen storage medium heat exchanger 29 serves to heat the hydrogen storage medium, in particular in the at least partially loaded form, from room temperature, i.e. from about 20° C., to a temperature level in the range from 120° C. to 180° C.

LOHC⁻, in particular dibenzyltoluene, referred to as H0 DBT, is kept in stock in the second hydrogen storage medium storage vessel 28. A second hydrogen storage medium heat exchanger 31, a hydrogen storage medium/hydrogen transfer medium separation unit 32 and optionally a hydrogen storage medium separation unit 33 are arranged along a transport conduit between the hydrogen transfer unit 6 and the second hydrogen storage medium storage vessel 28. The second hydrogen storage medium heat exchanger 31 serves to cool the LOHC⁻ from about 180° C. to 30° C. The hydrogen storage medium separation unit 33 is arranged downstream of the hydrogen storage medium/hydrogen transfer medium separation unit 32. The hydrogen storage medium/hydrogen transfer medium separation unit 32 is connected via a hydrogen transfer medium return conduit 34 to the second circulation conduit 9.

The optional hydrogen storage medium separation unit 33 is connected via a hydrogen storage medium return conduit 35 to the feed conduit for LOHC⁺, in particular between the first hydrogen storage medium storage vessel 27 and the hydrogen storage medium heat exchanger 29.

Figure 3:
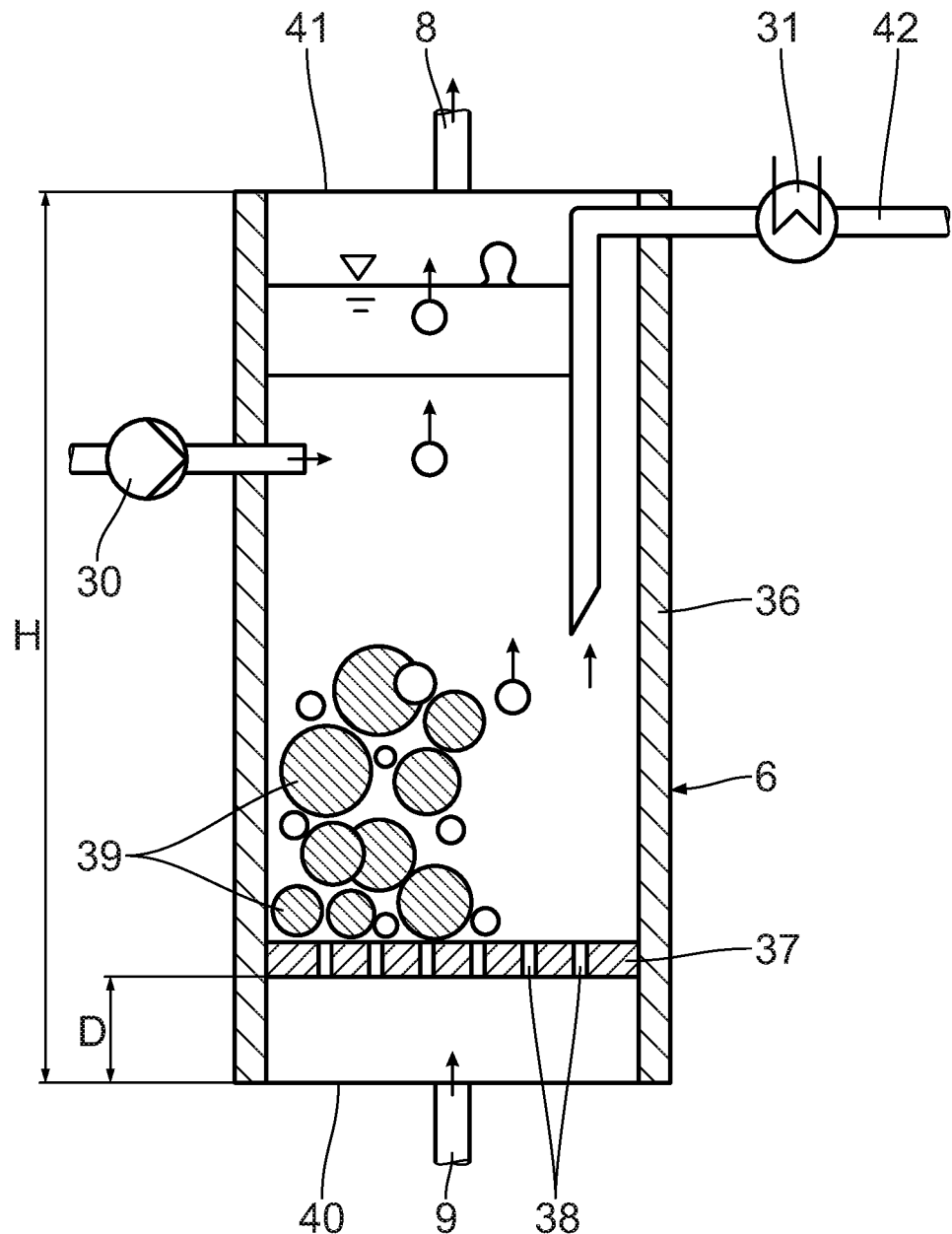
FIG. 3 is an enlarged sectional view of a hydrogen transfer unit of the apparatus in FIG. 2.

The structure of the hydrogen transfer unit 6 will be explained in more detail below with the aid of FIG. 3. The hydrogen transfer unit 6 comprises a reactor vessel 36 which is configured essentially as a hollow cylinder. The reactor vessel 36 is filled with hydrogen storage medium in liquid form. The reactor vessel 36 is upright, so that the longitudinal axis of the reactor is oriented essentially vertically.

A perforated plate 37 is arranged in a lower region of the reactor vessel 36. The perforated plate 37 has a plurality of open holes 38. Catalyst material 39 is arranged on the perforated plate 37. The distance D between the perforated plate 37 and the lower end face of the reactor vessel 36 is not more than half the height H of the reactor vessel 36. In particular: $D \leq 0.4 \cdot H$, in particular $D \leq 0.3 \cdot H$, in particular $D \leq 0.2 \cdot H$, in particular $D \leq 0.15 \cdot H$, in particular $D \leq 0.1 \cdot H$.

The second circulation conduit 9 is connected to the underside 40 of the reactor vessel 36 in order to introduce $TM^-$, in particulate acetone, into the reactor vessel 36, preferably in gaseous form. $TM^-$ can flow into the reactor vessel 36 and through the open holes 38 of the perforated plate 37 and contact the catalyst material 39 and also the hydrogen storage medium $LOHC^+$. As a result, hydrogen is transferred from the hydrogen storage medium $LOHC^+$ directly to the hydrogen transfer medium. $TM^+$ leaves the reactor vessel 36 via the first circulation conduit 8 connected to the upper side 41. $LOHC^-$ is discharged from the reactor vessel 36 via a discharge conduit 42 and fed to the second hydrogen storage medium heat exchanger 31 and the separation units 32, 33.

The contacting of the hydrogen storage medium with the hydrogen transfer medium in the hydrogen transfer unit 6 preferably occurs in countercurrent. The hydrogen-enriched hydrogen storage medium $LOHC^+$ from the hydrogen transfer unit 6 is therefore preferably fed by means of the hydrogen storage medium pump 30 into the upper third of the liquid-filled part of the reactor vessel 36, while the hydrogen-depleted hydrogen storage medium $LOHC^-$ is preferably taken off via the discharge conduit 42 from the lower third of the liquid-filled part of the reactor vessel 36.

The transfer of hydrogen from the hydrogen storage medium to the hydrogen transfer medium is improved thereby. The efficiency of the apparatus 7 is increased.

Figure 4:
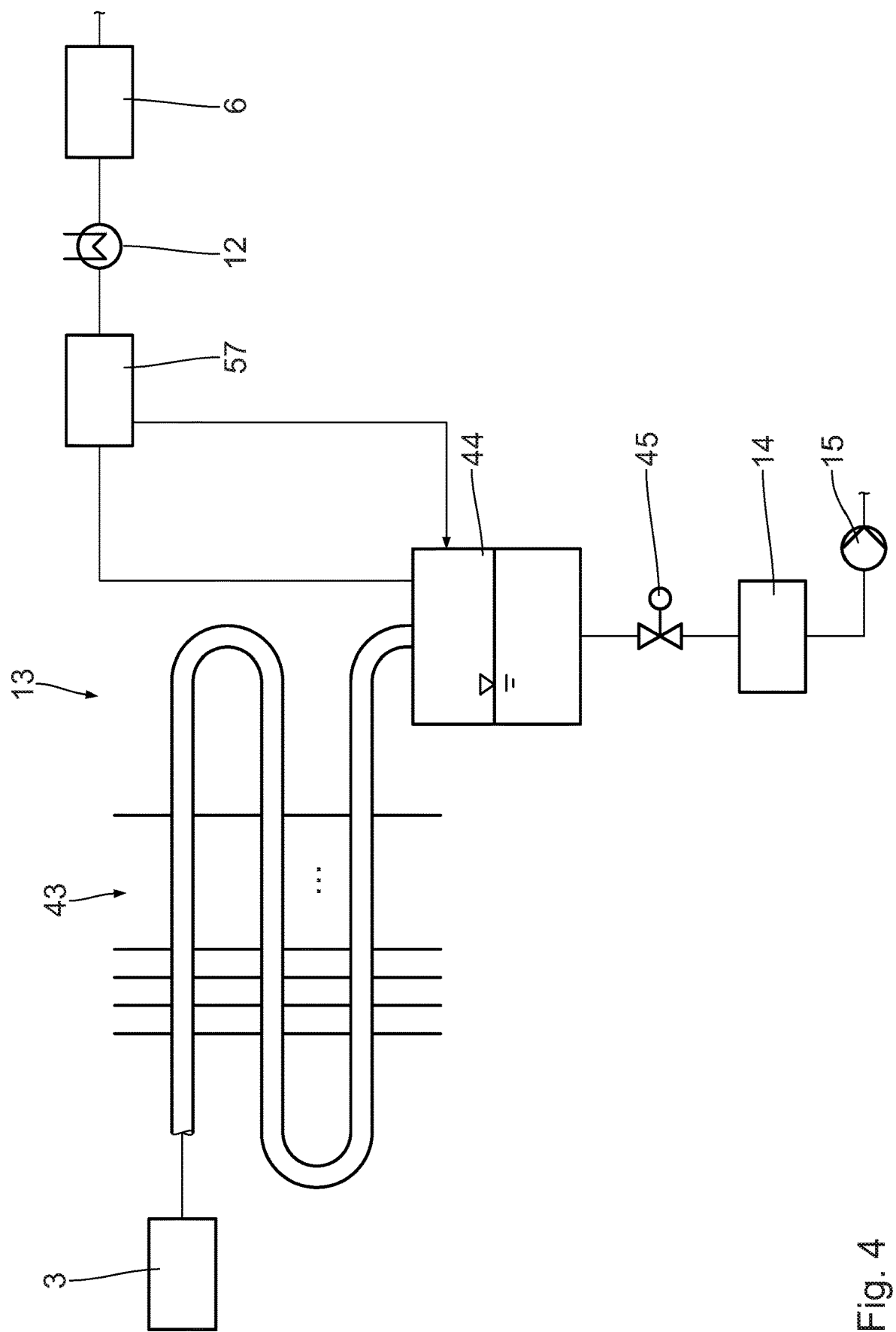
FIG. 4 is an enlarged detailed view of a hydrogen storage medium/hydrogen transfer medium separation unit as per FIG. 2.

The structure and the function of the hydrogen transfer medium separation unit 13 will be described in more detail below with the aid of FIG. 4. The hydrogen transfer medium separation unit 13 serves to separate $TM^+$ and $TM^-$. The hydrogen transfer medium separation unit 13 serves to condense acetone, i.e. $TM^-$, and thus to separate unreacted 2-propanol, i.e. $TM^+$, from the power generation unit 3. Unconsumed 2-propanol should be conveyed directly into the hydrogen transfer medium storage unit 14. $TM^-$ is conveyed into the hydrogen transfer unit 6 for enrichment with hydrogen.

Acetone has a boiling point of 56° C. 2-Propanol has a boiling point of 82° C. In general, hydrogen-enriched hydrogen transfer media $TM^+$ have a higher boiling point than their respective hydrogen-depleted counterpart $TM^-$. Condensation of the 2-propanol occurs by means of an air-cooled condenser 43 which has meandering conduit sections and leads into a condensate vessel 44. In the condensate vessel 44, the condensed liquid containing predominantly 2-propanol is collected and transferred by means of a condensate discharge conduit 45 into the hydrogen transfer medium storage unit 14. The gas containing predominantly acetone is introduced into a further condenser 57 which additionally performs the function of a droplet precipitator. Liquid condensed there, which consists predominantly of 2-propanol, is recirculated to the condensate vessel 44. The gas leaving the additional condenser 57 and droplet precipitator consists predominantly of acetone and is fed to the heat exchanger 12 in order to be heated and vaporized for renewed loading with hydrogen in the hydrogen transfer unit 6. The separation action of the hydrogen transfer medium separation unit 13 can be improved by repeated vaporization and condensation of the mixture of $TM^+$ and $TM^-$.

Figure 5:
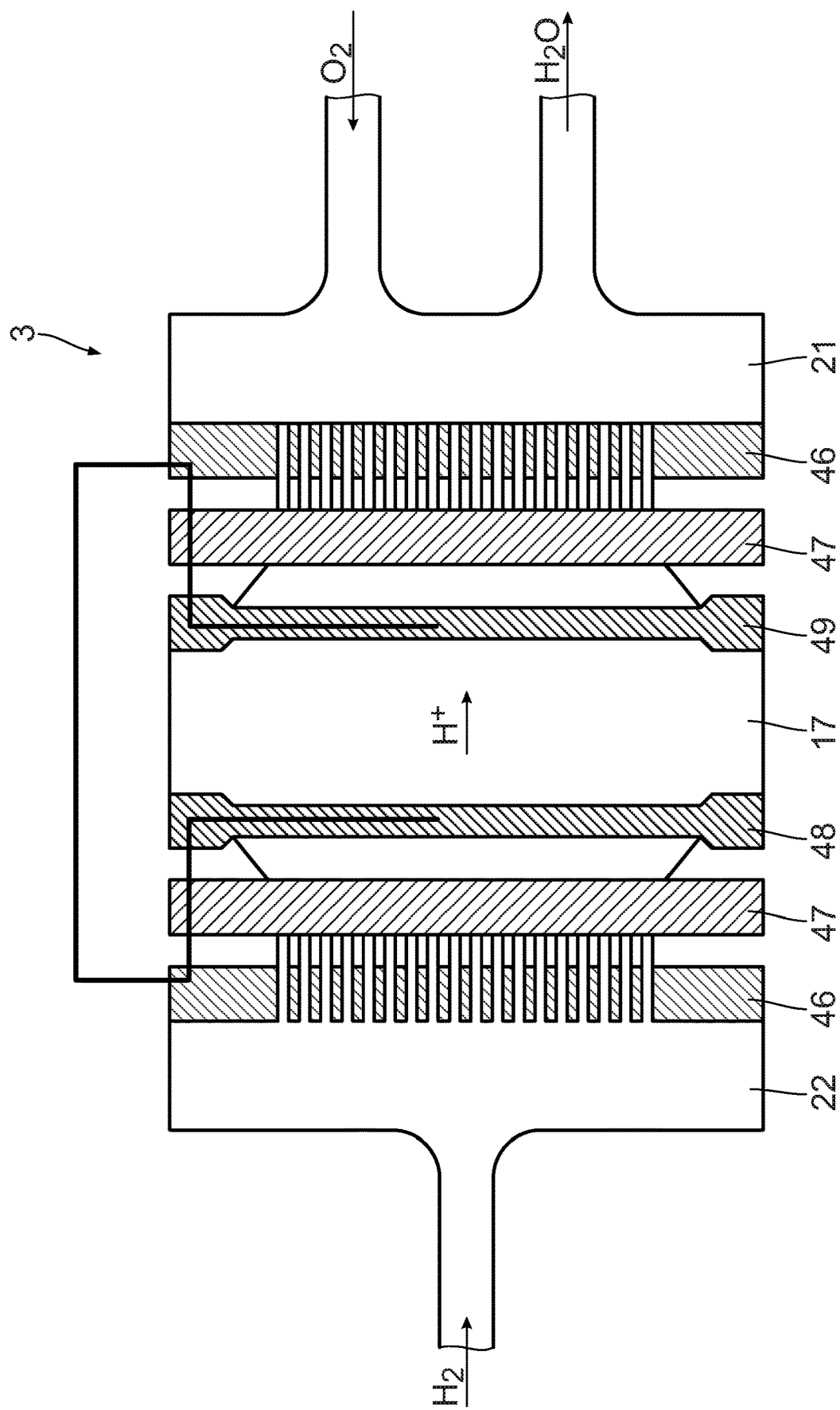
FIG. 5 is a schematic sectional view of a fuel cell of the apparatus in FIG. 2.

The structure and function of the power generation unit 3 will be explained in more detail below with the aid of FIG. 5. In the working example shown, the fuel cell is a low-temperature polymer electrolyte membrane (PEM) fuel cell which is operated at temperatures in the range from 80° C. to 90° C. Such a fuel cell is known from Qi, Z; Kaufmann, A.: "Performance of 2-Propanol in direct oxidation fuel cells", Journal of Power Sources 112 (2002) 121-129, which is expressly incorporated by reference in respect of the structure and function of the direct fuel cell.

The fuel cell is supplied with $TM^+$ on the anode side 22. $TM^+$ can flow via a bipolar plate 46 to a gas diffusion layer 47 and is made available at the anode 48. The proton-conducting member 17, which consists, for example, of a material which is known under the trade mark Nafion, is joined directly to the anode 48. In addition, the cathode 49 is provided on the side of the membrane 17 opposite the anode 48 and together with a further gas diffusion layer 47 and a further bipolar plate on the cathode side 21 completes the power generation unit 3. On the cathode side 21, air or oxygen-containing gas mixture is supplied and water is discharged.

The mode of operation of the apparatus 7 will be illustrated below. $TM^+$ is kept in stock in the hydrogen transfer medium storage unit 14 and is conveyed and heated by means of the hydrogen transfer medium pump 15 and the hydrogen transfer medium heat exchanger 16. The heating is necessary in order to heat the 2-propanol from about 20° C. to a required fuel cell temperature of about 80° C.

As a result of the heating, $TM^+$ vaporizes at least partially and is fed in gaseous form to the power generation unit 3. As an alternative, $TM^+$ can also be fed in liquid form to the power generation unit. In this case, the gas diffusion layer 47 of the power generation unit 3 is appropriately modified, replaced by a liquid distribution layer or omitted. In addition, oxygen-containing gas mixture from the oxygen stock 18 is fed via the oxygen pump 19 and the oxygen heat exchanger 20 to the power generation unit 3. The oxygen-containing gas mixture can additionally be humidified. The $TM^+$ fed in can also be additionally humidified.

The humidification of the gas mixture increases the proton conductivity of the membrane, in particular the Nafion membrane. The membrane is, in particular, a proton conductor only in the moistened state. When the power generation unit 3 is operated under drying conditions, for example using dry 2-propanol, dry air and at elevated temperature, the water generated in the power generation unit 3 may not be sufficient for maintaining the moisture content of the membrane. In the case of low-temperature fuel cells, a minimum moisture content of the membrane is necessary at an operating temperature of from 80° C. to 90° C. in order for the membrane to have a satisfactory proton conductivity.

The gas stream leaves the power generation unit 3 through the water heat exchanger 24 at which water condenses and heat is recovered at about 60° C. The condensed water is stored in the water storage vessel 23. In the power generation unit 3, $TM^+$ is converted into $TM^-$ over electrocatalysts which are present on the membrane 17:

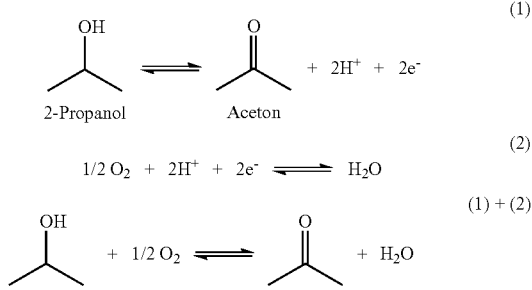

Preferred electrocatalysts, which are present on both sides of the membrane 17, contain metals or metal mixtures of Periodic Table groups 3 to 12, especially metals and metal mixtures of groups 8 to 10 of the 5th period and of the 6th period, for example ruthenium, rhodium, palladium, iridium and platinum, in particular platinum and ruthenium.

The fluid stream of $TM^-$ is fed via the second circulation conduit 9 to the hydrogen transfer medium separation unit 13 in order to separate $TM^+$ from $TM^-$ at least partially. $TM^+$ is fed to the hydrogen transfer medium storage unit 14.

$TM^-$ is heated by means of the second circulation heat exchanger 12 to a first reaction temperature T1 of about 180° C. required for the hydrogen transfer unit 6.

In addition, $LOHC^+$ is conveyed from the first hydrogen storage medium storage vessel 27 through the hydrogen storage medium pump 30 and heated by means of the hydrogen storage medium heat exchanger 29 to the first reaction temperature T1 from the tank temperature of about 20° C. in the first hydrogen storage medium storage vessel 27. The tank temperature is, in particular, in the range from 0° C. to 80° C. In this way, $TM^-$ is at least partially loaded in the hydrogen transfer unit 6 and leaves the hydrogen transfer unit 6 via the first circulation conduit 8 and the first circulation heat exchanger 10. $TM^+$ can be fed directly to the power generation unit 3 and/or the hydrogen transfer medium storage unit 14. Hydrogen storage medium discharged from the hydrogen transfer unit 6 unintentionally condenses at the first circulation heat exchanger 10 and can be recirculated via the first circulation return conduit 11 into the hydrogen transfer unit 6.

$LOHC^-$ from the hydrogen transfer unit 6 is cooled by means of the second hydrogen storage medium heat exchanger 31 to a temperature T3 and fed to the hydrogen storage medium/hydrogen transfer medium separation unit 32 which separates off the hydrogen transfer medium entrained in the hydrogen storage medium and recirculated via the hydrogen transfer medium return conduit 34. In the optional hydrogen storage medium separation unit 33, the still enriched, at least partially loaded hydrogen storage medium $LOHC^+$ is separated off from the hydrogen storage medium and fed to the first hydrogen storage medium storage vessel 27. $LOHC^-$ is fed to the second hydrogen storage medium storage vessel 28. The hydrogen storage medium separation unit 33 is optional.

It is a characteristic of an advantageous hydrogen storage medium storage unit that $LOHC^+$ and $LOHC^-$ are stored in separate chambers or tanks and do not mix. However, both chambers or tanks can be installed in a tank system 53 and utilize the same storage volume, for example by use of a movable membrane between two storage vessel chambers.

In order to go from the above-described standard operation to an operating point change when the load is increased, i.e. to cover a comparatively higher power demand, the pumping rates of the pumps 15 and 19 are firstly increased in order to increase the introduction of $TM^+$ and the oxygen-containing gas mixture into the power generation unit 3. This occurs, in particular in a load-dependent way, by means of electric energy from the battery 4. The higher volume flows in the power generation unit 3 make more electric power available. The amount of heat to be removed from the power generation unit 3 thus also increases, especially at the water heat exchanger 24 and in the hydrogen transfer medium separation unit 13. The power generation unit 3 itself can optionally also be actively cooled, for example by means of a blower.

In order to balance the increased consumption of $TM^+$ and the increased volume flow, the preheating temperature for the hydrogen transfer unit 6 is increased at the second circulation heat exchanger 12 and the hydrogen storage medium heat exchanger 29. The volume flow of the loaded hydrogen storage medium at the hydrogen storage medium pump 30 is also increased with the increased volume flow of $LOHC^-$, so that a reaction mixture suitable for hydrogen transfer is always available in the hydrogen transfer unit 6.

In the case of a decrease in load, it is necessary to get to a load state having a reduced provision of electric power. Accordingly, the pumping rates of the pumps 15 and 19 are reduced according to load, so that a reduced volume flow goes from the storage unit 14 into the fuel cell 3. As a result of the reduced volume flows of hydrogen transfer medium and oxygen-containing gas, less electric power is made available in the fuel cell 3. Excesses of electric power made available by the fuel cell 3 can advantageously be temporarily stored in the battery 4 until the latter is fully charged.

The power of the hydrogen transfer unit 6 is decreased as a function of the fill level in the hydrogen transfer medium storage unit 14 until the hydrogen transfer medium storage unit 14 is virtually completely full. The power of the hydrogen transfer unit 6 is preferably held at a high production level until the storage unit 14 is virtually completely full. The productivity of the hydrogen transfer unit 6 is reduced by reducing the volume flows of $TM^-$ from the hydrogen transfer medium separation unit 13 and $LOHC^+$ from the first hydrogen storage medium storage vessel 27. In addition, the temperature of the hydrogen transfer unit 6 can be decreased, since the productivity in the hydrogen transfer unit 6 decreases at a reduced reaction temperature.

To run down the apparatus 7 from normal operation into a rest state, known as a stand-by mode, the apparatus 7 is firstly operated in standard operation until the electric battery 4 is fully charged. The power generation unit 3 is then switched off by stopping the introduction of loaded hydrogen transfer medium. Oxygen-containing gas mixture can still be maintained by means of the oxygen pump 19, particularly when this is necessary for running down the power generation unit 3. The introduction of oxygen-containing gas mixture can subsequently be interrupted.

$TM^+$ is then fed directly from the hydrogen transfer unit 6 into the hydrogen transfer medium storage unit 14. For this purpose, a valve arranged upstream of the power generation unit 3 can be closed in order to cool $TM^+$ by means of the hydrogen transfer medium heat exchanger 16 and feed it into the storage unit 14. For this purpose, the hydrogen transfer medium pump 15 can be operated in the reversed transport direction. In addition or as an alternative, a further pump can be used. Hydrogen transfer medium continues to be fed from the hydrogen transfer medium storage unit 14 into the hydrogen storage medium in the hydrogen transfer unit 6 until the mixture in the hydrogen transfer unit 6 contains predominantly $TM^+$. When the hydrogen transfer medium storage unit 14 is full, further introduction of TM⁻ into the hydrogen transfer unit 6 and introduction of LOHC⁺ into the hydrogen transfer unit 6 are stopped. A basic amount of hydrogen transfer medium and hydrogen storage medium remains in the hydrogen transfer unit 6 and can react with the residual heat of the hydrogen transfer unit 6 to form TM⁺ and LOHC⁻. A further reservoir of TM⁺ is thus provided, in particular in addition to the amount of TM⁺ which is present in storage in the hydrogen transport medium storage unit 14.

In order to run down the apparatus 7 additionally into a stoppage mode, the introduction of TM⁻ into the hydrogen transfer unit 6 is stopped after the hydrogen transfer medium storage unit 14 is full, but the introduction of LOHC⁺ is maintained. A basic amount of LOHC⁺ without admixture of any hydrogen transfer medium thus remains in the hydrogen transfer unit 6. A basic charge which has a high flash point is thus provided in the hydrogen transfer unit, which makes, for example, maintenance work on the hydrogen transfer unit 6 safe.

In order to make an emergency shutdown from ongoing operation possible, the hydrogen transfer unit 6 is depressurized to ambient pressure and all pumps except for the oxygen pump 19 are switched over to zero-flow. In addition, all valves in the fluid conduits are closed. An emergency shutdown can, for example, be necessary as a result of a buildup of pressure in the hydrogen transfer unit 6, in the case of load shedding in the power generation unit 3 or in the case of leakages along the transport conduits or short circuits on the electric motor 2.

In order to start up the apparatus 7 from a stoppage, the hydrogen transfer medium storage unit 14 is filled with enriched hydrogen transfer medium. The battery 4 is electrically charged. The first hydrogen storage medium storage vessel 27 is filled with loaded hydrogen storage medium. Correspondingly, the second hydrogen storage medium storage vessel 28 is emptied. All separation units 13, 32, 33, all heating devices, pumps are at room temperature, dry and without electric power.

To start up from the rest state, known as stand-by operation, the hydrogen transfer medium storage unit 14 is partially filled with TM⁺. The battery 4 is at least half-charged electrically. The storage vessels 27, 28 are partially filled with hydrogen storage medium. If electric power is required by the electric motor 2, hydrogen transfer medium is conveyed from the hydrogen transfer medium storage unit 14 via the hydrogen transfer medium pump 15 and the hydrogen transfer medium heat exchanger 16 into the power generation unit 3. For this purpose, the hydrogen transfer medium heat exchangers 16 are operated as electric heaters during the start-up procedure and are supplied with electric power by the electric battery 4. At the same time, the oxygen-containing gas mixture is conveyed by means of the oxygen pump 19 into the power generation unit 3. The pumps 15, 19 are supplied with electric power by the electric battery 4 and the power generation unit 3 is brought to operating temperature by means of the generation of power. Until the required operating temperature has been attained, the cooling remains switched off in the power generation unit 3. The hydrogen transfer medium separation unit 13 can likewise be preheated and brought to operating temperature by means of the electric battery 4.

The hydrogen transfer unit 6 is brought by means of electric heating to a temperature above the boiling point of all hydrogen transfer media components, typically to a temperature in the range from 120° C. to 220° C. As soon as this temperature has been attained, LOHC⁺ is conveyed via the hydrogen storage medium pump 30 and the hydrogen storage medium heat exchanger 29 and TM⁻ is conveyed via the second circulation heat exchanger 12.

Figure 6:
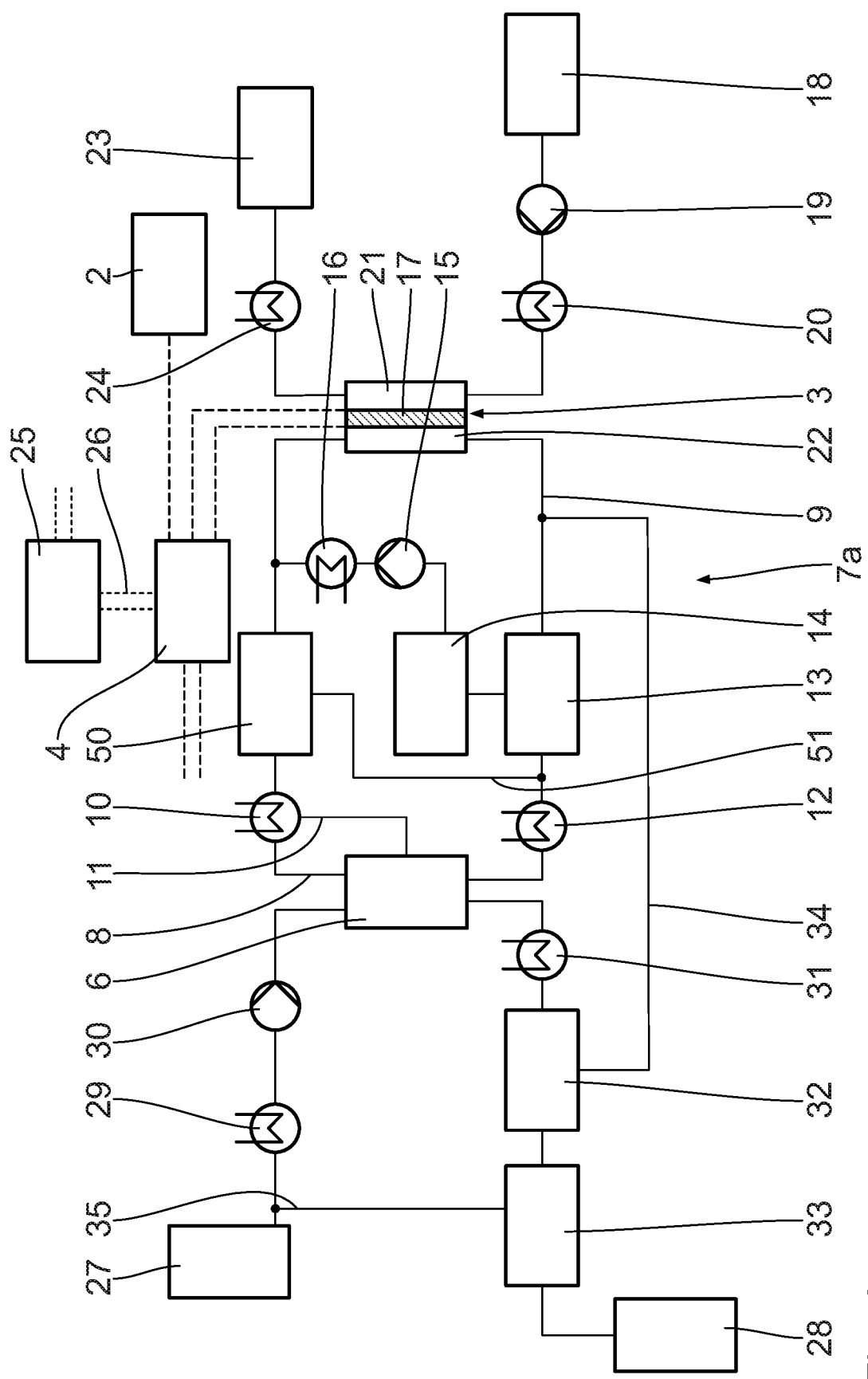
FIG. 6 is a view corresponding to FIG. 2 of an apparatus according to a second working example.

A second working example of the invention will be described below with reference to FIG. 6. The structurally identical parts are denoted by the same reference numerals as in the first working example, the description of which is hereby incorporated by reference. Structurally different but functionally similar parts are designated by the same reference numerals with a suffix a.

The main difference from the first working example is that the apparatus 7a has a hydrogen transfer medium/hydrogen transfer unit 50 which is arranged downstream of the first circulation heat exchanger 10 along the first circulation conduit 8. The hydrogen transfer medium/hydrogen separation unit 50 makes it possible to separate TM⁻ from TM⁺ and/or hydrogen gas, which may possibly have been formed, in the fluid stream.

The mixture of hydrogen gas and TM⁺ is conveyed directly to the power generation unit 3 via the first circulation conduit 8. The TM⁻ which have been separated off is fed via a hydrogen transfer medium return conduit 51 to the second circulation conduit 9. The hydrogen transfer medium return conduit 51 opens into the second circulation conduit at a position between the hydrogen transfer medium separation unit 13 and the second circulation heat exchanger 12.

Instead of the air which flows around the meandering conduit sections of the condenser 43, it is also possible to use, in addition or as an alternative, 2-propanol which is to be conveyed from the hydrogen transfer medium separation unit 13 to the hydrogen transfer unit 6. This is advantageous particularly when the hydrogen transfer medium/hydrogen separation unit 50 is provided along the first circulation conduit 8. In this separation unit 50, the condensate consists mostly of 2-propanol which can then be fed to the power generation unit 3. Gaseous acetone can be introduced again at the underside 40 of the hydrogen transfer unit 6.

The low-temperature polymer electrolyte membrane fuel cell according to both the first working examples has various possibilities for heat integration. For example, waste heat from the water heat exchanger 24 can be supplied to one of the heat exchangers 29, 20, 16 and/or 12. In addition or as an alternative, it is possible to supply the separation units 13, 32, 33 and/or 50 with waste heat from the water heat exchanger 24. The heat from the water heat exchanger 24 is provided in a temperature range from 80° C. to 90° C. If the fuel cell 3 is actively cooled, this heat stream can also be utilized correspondingly.

The waste heat from the first circulation heat exchanger 10 is in the temperature range from 120° C. to 220° C. and can likewise be utilized in the heat exchangers 12, 16, 20 and 29 and/or for heating the separation units 13, 32, 33 and/or 50. This likewise applies to waste heat from the second hydrogen storage medium heat exchanger 31 which provides waste heat in the temperature range from 120° C. to 220° C.

Figure 7:
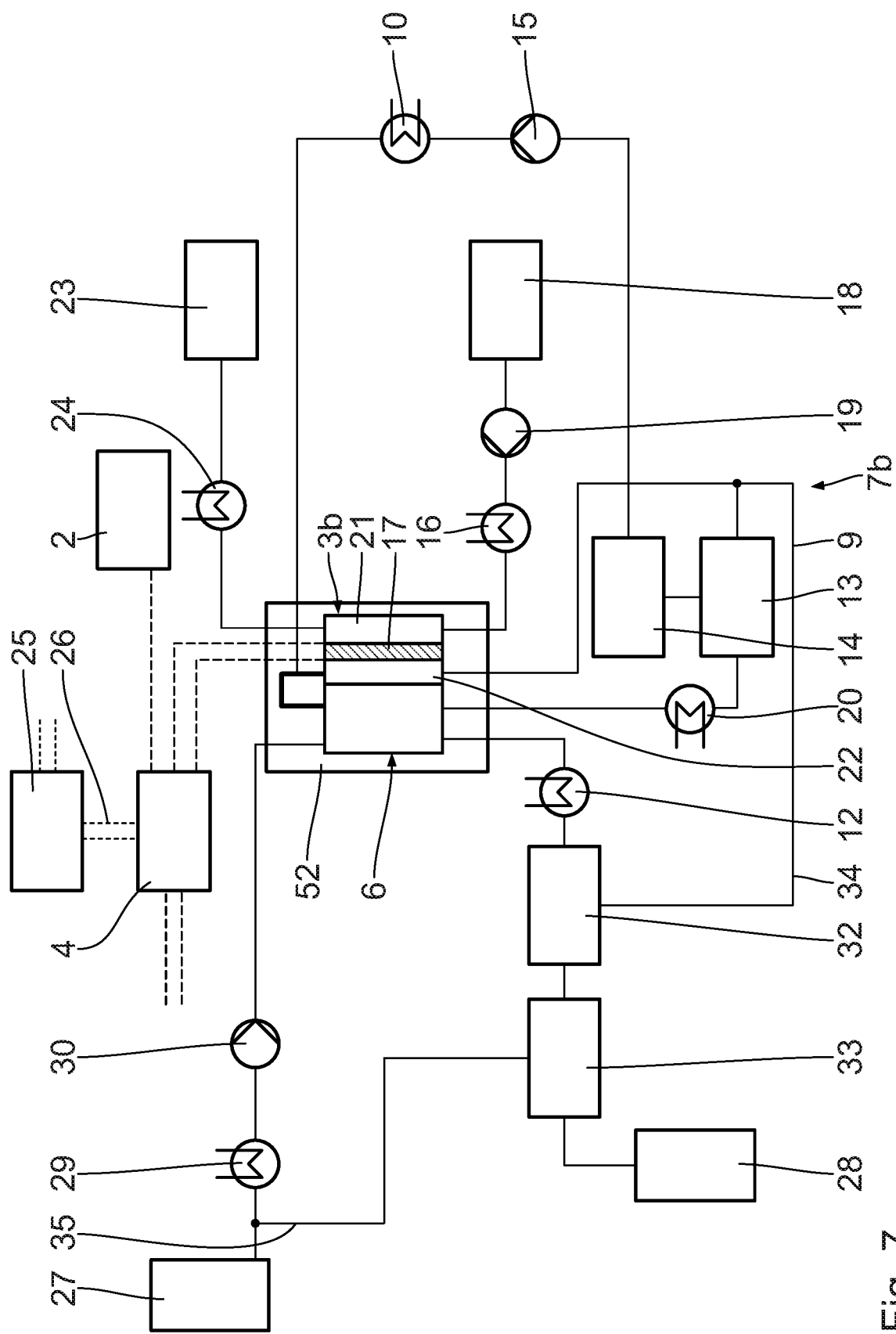
FIG. 7 is a view corresponding to FIG. 2 of an apparatus according to a third working example.

A third working example of the invention will be described below with reference to FIG. 7. Structurally identical parts are denoted by the same reference numerals as in both the first working examples, the description of which is hereby incorporated by reference. Structurally different but functionally similar parts are designated by the same reference numerals with a suffix b.

The main difference from the previous working examples is that the power generation unit 3b is configured as high-temperature polymer electrolyte membrane fuel cell. The typical reaction temperatures of the fuel cell 3b are in the temperature range from 140° C. to 200° C.

The power generation unit 3b is coupled directly to the hydrogen transfer unit 6 and is arranged in a joint apparatus housing 52.

The apparatus housing 52 is, in particular, thermally insulated and can have an additional electric heater which makes it possible to heat the apparatus housing 52 to a temperature range of from 140° C. to 200° C. and in particular ensures that the apparatus housing 52 is kept at this temperature level. The apparatus housing can also be provided with active cooling, so that the temperature of the apparatus housing can in all operating states be kept in a range which is optimum for the efficiency of the arrangement.

The apparatus 7b comprises the hydrogen storage medium separation unit 33. The hydrogen storage medium separation unit 33 can also be dispensed with. In addition or as an alternative, the hydrogen transfer medium/hydrogen separation unit 50 can be provided, but this is not shown in the working example as per FIG. 7 for reasons of presentation.

The operation of the apparatus 7b is described in more detail below. Operation, in particular the various modes of operation, are in principle not different from the operation of the apparatus 7 as per the first working example.

As a result of the apparatus housing 52 being thermally insulated and enclosing both the power generation unit 3b and the hydrogen transfer unit 6, thermal exchange between these units is improved. In particular, heat transfer between the power generation unit 3b and the hydrogen transfer unit 6 occurs directly. Both units 3b are at the same temperature or a very similar temperature. The maximum temperature difference between the power generation unit 3b and the hydrogen transfer unit 6 is not more than 100 k, in particular not more than 70 K, in particular not more than 50 K, in particular not more than 30 K, in particular not more than 20 K, in particular not more than 10 K and in particular not more than 5 K.

Heat transfer losses are reduced and in particular avoided. This makes it possible, in particular, to reduce the additional heating outlay for the power generation unit 3b and the hydrogen transfer unit 6 since both components 3b, 6 are arranged within the thermally insulated apparatus housing 52. However, it is also possible to cool the apparatus housing 52 in order to remove undesirable excesses of heat.

While specific embodiments of the invention have been shown and described in detail to illustrate the application of the principles of the invention, it will be understood that the invention may be embodied otherwise without departing from such principles.

The invention claimed is:

1. An apparatus for generating electric power, the apparatus comprising:
 a hydrogen transfer unit for transferring hydrogen from a hydrogen storage medium to a hydrogen transfer medium, whereby the hydrogen storage medium is a liquid organic hydrocarbon compound (LOHC);
 a power generation unit for generating electric power from the hydrogen transfer medium.

2. The apparatus as claimed in claim 1, further comprising a hydrogen storage medium storage unit for storing the hydrogen storage medium in at least one of partially loaded state LOHC$^+$ and in at least partially unloaded state LOHC$^-$.

3. The apparatus as claimed in claim 2, wherein each of the LOHC$^+$ and LOHC$^-$ is stored in a separate storage chamber without mixing.

4. The apparatus as claimed in claim 1, further comprising a hydrogen transfer medium storage unit for storing the hydrogen transfer medium.

5. The apparatus as claimed in claim 1, wherein the power generation unit is a fuel cell for converting the hydrogen transfer medium into electric power.

6. The apparatus as claimed in claim 5, wherein the fuel cell has a membrane.

7. The apparatus as claimed in claim 6, wherein the fuel cell has a proton-conducting membrane.

8. The apparatus as claimed in claim 5, wherein the power generation unit is a direct fuel cell for converting the hydrogen transfer medium into electric power.

9. The apparatus as claimed in claim 1, further comprising an electric battery connected to the power generation unit.

10. The apparatus as claimed in claim 9, further comprising an electric battery connected directly to the power generation unit.

11. The apparatus as claimed in claim 1, further comprising an electric load.

12. The apparatus as claimed in claim 11, wherein the electric load is an electric motor.

13. The apparatus as claimed in claim 11, wherein the electric load is connected to a battery.

14. The apparatus as claimed in claim 1, further a hydrogen storage medium/hydrogen transfer medium separation unit for separating the hydrogen storage medium from the hydrogen transfer medium.

15. The apparatus as claimed in claim 1, further comprising a hydrogen transfer medium separation unit for separating at least partially loaded hydrogen transfer medium from at least partially unloaded hydrogen transfer medium, with the hydrogen transfer medium separation unit being arranged downstream of the power generation unit.

16. The apparatus as claimed in claim 1, further comprising a hydrogen storage medium separation unit for separating at least partially loaded hydrogen storage medium from at least partially unloaded hydrogen storage medium, with the hydrogen storage medium separation unit being arranged downstream of the hydrogen storage medium/hydrogen transfer medium separation unit.

17. The apparatus as claimed in claim 1, further comprising a regulating unit for regulated operation of the apparatus.

18. The apparatus as claimed in claim 17, wherein the regulating unit is in bidirectional signal communication with the hydrogen transfer unit and the power generation unit.

19. A mobile device comprising:
 an apparatus comprising:
  a hydrogen transfer unit for transferring hydrogen from a hydrogen storage medium to a hydrogen transfer medium, whereby the hydrogen storage medium is a liquid organic hydrocarbon compound (LOHC);
  a power generation for generating electric power from the hydrogen transfer medium.

20. A mobile device as claimed in claim 19, wherein the mobile device is an electrically powered vehicle.

21. A process for generating electric power, the process comprising the process steps:
 transferring hydrogen from a hydrogen storage medium to a hydrogen transfer medium by a hydrogen transfer unit, whereby the hydrogen storage medium is a liquid organic hydrocarbon compound (LOHC);
 generating electric power from the hydrogen transfer medium by a power generation unit.

22. The process as claimed in claim 21, wherein the hydrogen transfer medium in the at least partially unloaded state has a carbon-oxygen double bond of the type

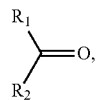

where $R_1$ and $R_2$ are identical or different and are each an alkyl radical, cycloalkyl radical or aryl radical having 1-8 carbon atoms or $R_1$ and $R_2$ are joined to form a ring and $R_1$ and $R_2$ have one or more additional carbon-oxygen double bonds in addition to the carbon atoms.

23. The process as claimed in claim 21, wherein the hydrogen storage medium comprises a liquid mixture of a plurality of organic compounds.

* * * * *